US012729772B2

(12) United States Patent
Martin et al.

(10) Patent No.: US 12,729,772 B2
(45) Date of Patent: Sep. 8, 2026

(54) ADDITIVELY MANUFACTURED HYDRAULIC VALVE COMPONENTS

(71) Applicant: Caterpillar Inc., Peoria, IL (US)

(72) Inventors: Kevin L. Martin, Washburn, IL (US); Paul A. Zwart, Dunlap, IL (US); Michael Charles Marstall, Peoria, IL (US); Mikhail A. Sorokin, Naperville, IL (US); Lonnie James Devier, Channahon, IL (US)

(73) Assignee: Caterpillar Inc., Peoria, IL (US)

( * ) Notice: Subject to any disclaimer, the term of this patent is extended or adjusted under 35 U.S.C. 154(b) by 336 days.

(21) Appl. No.: 18/313,695

(22) Filed: May 8, 2023

(65) Prior Publication Data

US 2023/0279957 A1 Sep. 7, 2023

Related U.S. Application Data

(63) Continuation of application No. 17/189,914, filed on Mar. 2, 2021, now Pat. No. 11,662,031.

(51) Int. Cl.

| | |
|---|---|
| ***F16K 11/07*** | (2006.01) |
| ***B22F 10/28*** | (2021.01) |
| ***B33Y 10/00*** | (2015.01) |
| ***B33Y 80/00*** | (2015.01) |
| ***F15B 11/18*** | (2006.01) |
| ***F15B 13/08*** | (2006.01) |
| ***F16K 15/04*** | (2006.01) |

(Continued)

(52) U.S. Cl.

CPC .............. *F16K 11/07* (2013.01); *B22F 10/28* (2021.01); *B33Y 10/00* (2014.12); *B33Y 80/00* (2014.12); *F15B 11/183* (2013.01); *F15B 13/0842* (2013.01); *F16K 15/044* (2013.01); *F16K 17/0406* (2013.01); *F16K 17/08* (2013.01)

(58) Field of Classification Search

CPC ............... F16K 1/36; F16K 1/42; F16K 11/07

See application file for complete search history.

(56) References Cited

U.S. PATENT DOCUMENTS 2,471,289 A 5/1949 Sedgwick
5,680,889 A * 10/1997 Boger ........................ F16K 5/12 251/121
6,397,890 B1 6/2002 Mickelson et al.

(Continued)

FOREIGN PATENT DOCUMENTS

CN 1295440 C 1/2007
CN 105308372 A 2/2016

(Continued)

OTHER PUBLICATIONS

Written Opinion and International Search Report for Int'l. Patent Appln. No. PCT/US2022/018074, mailed Jun. 22, 2022 (17 pgs).

*Primary Examiner* — Abiy Teka

(57) ABSTRACT

A method of manufacturing a hydraulic valve component using additive manufacturing includes laying successive layers to form a flow aperture for a hydraulic valve component, and creating a lattice or mesh structure that at least partially defines the flow aperture of the hydraulic valve component, or a feature that forms an undercut along a direction that is parallel to a flow direction of the flow aperture, or a flow aperture having a size varying along a circumferential direction of the valve component.

13 Claims, 15 Drawing Sheets

(51) Int. Cl.
*F16K 17/04* (2006.01)
*F16K 17/08* (2006.01)

(56) References Cited

U.S. PATENT DOCUMENTS

| | | | | |
|---|---|---|---|---|
| 6,397,990 | B1 | 6/2002 | Brien et al. | |
| 9,597,732 | B2 * | 3/2017 | Lewis | B33Y 10/00 |
| 2016/0290368 | A1 * | 10/2016 | Collins | F16K 31/0675 |
| 2018/0281940 | A1 | 10/2018 | Collins | |
| 2019/0015228 | A1 | 1/2019 | Frid et al. | |
| 2019/0178391 | A1 | 6/2019 | Gottlieb et al. | |

FOREIGN PATENT DOCUMENTS

| | | | | |
|---|---|---|---|---|
| CN | 106704622 | A | 5/2017 | |
| CN | 106704634 | A | 5/2017 | |
| CN | 107030282 | A | 8/2017 | |
| CN | 206386502 | | 8/2017 | |
| CN | 109073113 | A | 12/2018 | |
| CN | 109519431 | A | 3/2019 | |
| GB | 2204664 | A * | 11/1988 | B01D 61/06 |
| GB | 2547863 | A | 8/2017 | |
| GB | 2549069 | A2 | 10/2017 | |

* cited by examiner 300
304
306
308
310
314
316
318
320
322
324
326
330
334
358
360
362
364
302
370

322
334
330
336
304
332
302
300
324
310
315
346
364
340
342
348
312
314
366
338
362
308
334
306
328
320
326

300
310
312
316
306
318
356
314

300a
304a
306a
308a
310a
312a
314a
314b
316a
318a
320a
322a
324a
326a
328a
330a
332a
334a
336a
350
350a
352
354
356a
358a
360a
362a
364a
366a
368a
370a 600
614
606
604
602
622
612

616
618
608
610

ADDITIVELY MANUFACTURED HYDRAULIC VALVE COMPONENTS

CROSS-REFERENCE TO RELATED APPLICATION(S)

This patent application is a continuation of and claims the benefit of priority to U.S. application Ser. No. 17/189,914, filed on Mar. 2, 2021, the entirety of which is incorporated herein by reference.

TECHNICAL FIELD

The present disclosure relates to hydraulic valves used on heavy machinery employed in the earth moving, construction, and mining industries or the like. Specifically, the present disclosure relates to a valve component such as a spool, a compensator cup, or a poppet valve member, etc. that are manufactured via an additive process to provide geometry that fine tunes the various functions of these components.

BACKGROUND

Heavy machinery such as those employed in the earth moving, construction, and mining industries employ various work implements that are powered hydraulically to effectuate their movement and their work such as moving payloads via buckets, breaking up materials using a hydraulic hammer, lifting a boom, etc.

Current hydraulic valve assemblies used in these applications may have spools, compensator cups, and/or poppet valves that translate axially or otherwise move (e.g., may rotate) to allow hydraulic fluid flow. The shape of these components affects certain characteristics of the valve performance like stability, axial force to move the valve, and the metering characteristics of the valve. However, the shapes of these components are typically defined by conventional machining. Hence, the complexity of these features are less intricate than desired, limiting the tailoring of these features for certain desired performances.

U.S. Pat. Application Publ. No. 20190178391 A1 discloses a ball for use within a ball valve that includes an outer wall, an inner wall that defines a central bore, and a lattice structure that is positioned within an interior space defined between the outer wall and the inner wall. The ball may include one or more flow conditioners positioned within the central bore for enabling more accurate downstream flow measurement and/or strengthen or stabilize the ball. The ball may be formed via an additive manufacturing process.

As can be seen, a need still exists for a valve component that has more intricate features so that its hydraulic performance may be more closely tailored to a desired output that found in the prior art.

SUMMARY

A valve assembly according to an embodiment of the present disclosure may comprise a housing member defining a plurality of bores, at least one valve component that is disposed in at least one of the plurality of bores that defines an axis of translation, a radial direction, and a circumferential direction. At least one valve component includes a flow aperture that is at least partially defined by a mesh structure, or a structure that is drafted along the radial direction, or that includes a change in size along the circumferential direction.

A spool for use with a hydraulic assembly according to an embodiment of the present disclosure may comprise an elongated body defining a longitudinal axis, a first outer diameter portion and a second outer diameter portion spaced longitudinally away from the first out diameter portion. A first necked down portion may be disposed longitudinally between the first outer diameter portion, and the second outer diameter portion. The elongated body may include at least one of the following: a lattice structure that extends from the first outer diameter portion diameter portion to the first necked down portion, and a cross-section of the first necked down portion that is asymmetrical about a plane that passes through the longitudinal axis.

A poppet valve subassembly according to an embodiment of the present disclosure may comprise an annular valve seat member including a first arcuate surface defining an axis of rotation, a radial direction, and a circumferential direction, and a valve seating surface extending radially inwardly from the first arcuate surface, as well as a valve member including a second arcuate surface, and a sealing surface extending radially inwardly from the second arcuate surface and axially toward the valve seating surface. At least one of the valve seat member and the valve member may include at least one of the following: a first mesh that extends from the first arcuate surface that partially defines a flow orifice, a second mesh that extends from the second arcuate surface that partially defines a flow orifice, an asymmetric configuration of the first arcuate surface or the valve seating surface about a plane that contains the radial direction and the axis of rotation, an asymmetric configuration of the second arcuate surface or the sealing surface about a plane that contains the radial direction and the axis of rotation, a series of dimples disposed circumferentially, and at least one flow aperture extending radially from the first arcuate surface or the second arcuate surface, and the at least one flow aperture may include at least one of following: asymmetry about a plane that is perpendicular to the axis of rotation, and a change in size along the radial direction.

A compensator cup for use with a valve assembly according to an embodiment of the present disclosure may comprise a body including an arcuate surface defining an axis of rotation, a radial direction, and a circumferential direction; a first axial end; and a second axial end. A first blind bore may extend from the first axial end defining a diameter, and at least one flow aperture may extend radially from the arcuate surface to the first blind bore. The flow aperture may include at least one of following: a change in size along the circumferential direction, and a change in size along the radial direction.

A method of manufacturing a hydraulic valve component via additive manufacturing according to an embodiment of the present disclosure may comprise laying successive layers to form a flow aperture for a hydraulic valve component, and creating a lattice or mesh structure that at least partially defines the flow aperture of the hydraulic valve component, or a feature that forms an undercut along a direction that is parallel to a flow direction of the flow aperture, or a flow aperture having a size varying along a circumferential direction of the valve component.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

In the drawings.

DETAILED DESCRIPTION

Figure 1:
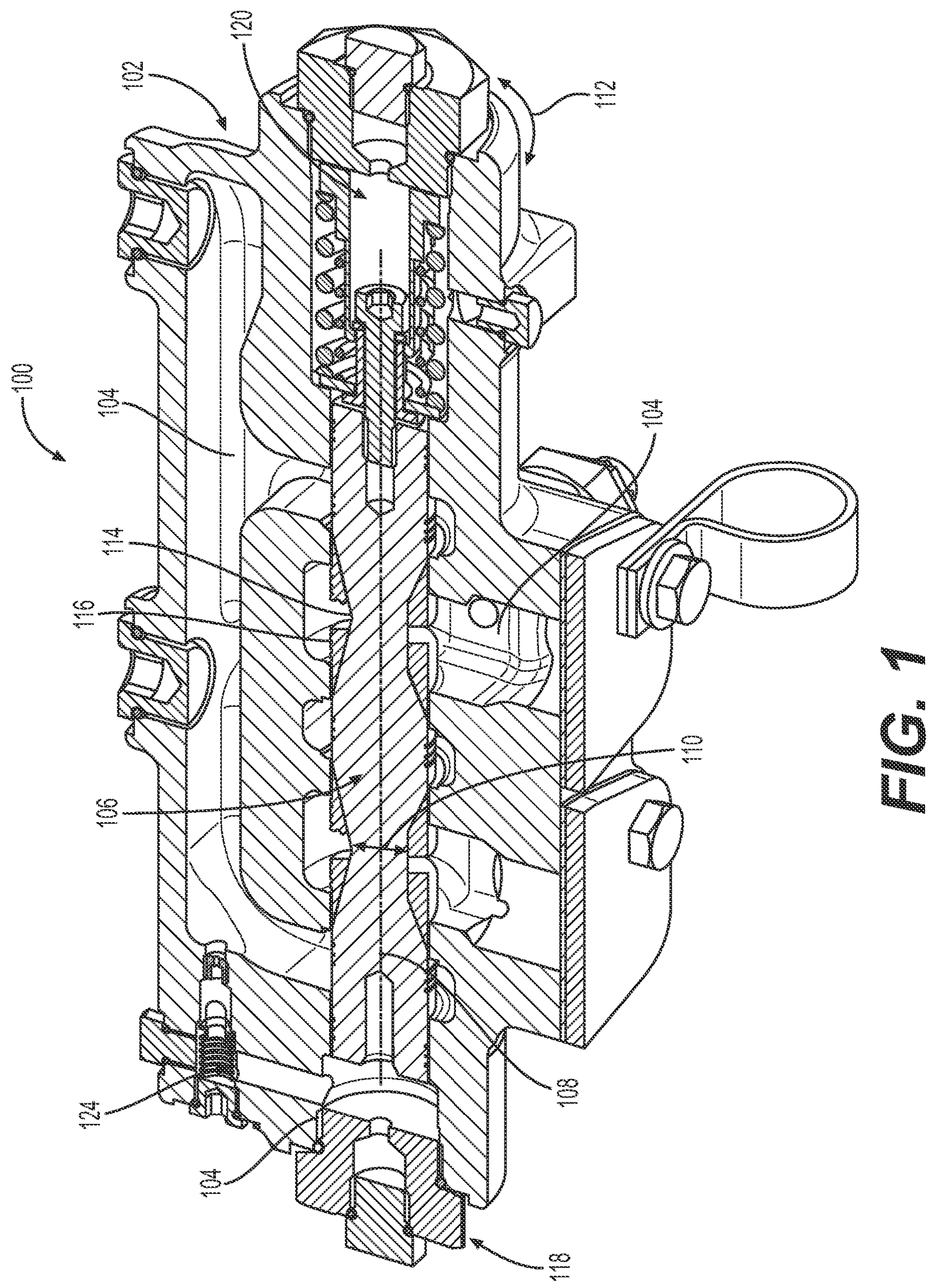
FIG. 1 is a sectional view of a hydraulic valve assembly including a valve spool constructed via additive manufacturing according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of a valve assembly that are constructed according to the principles of the present disclosure will be discussed that may provide better tuning of performances of various valve components and valve assemblies in terms of flow area enlargement or decrement that may be constructed using additive manufacturing. Exemplary embodiments of various valve components according to various embodiments of the present disclosure such as poppet valves, spools, and compensator cups shall be discussed in detail. Also, a method for constructing such valve components will be discussed. It is to be further understood that the described valve assemblies and components may be used in heavy machinery such as that used in the construction, earth-moving, and mining industries as well as other industrial applications not specifically mentioned herein.

Starting with FIGS. 1 and 2, valve assemblies 100, 200 that are configured according to various embodiments of the present disclosure will now be discussed. As shown, these valve assemblies 100, 200 may comprise a housing member 102, 202 defining a plurality of bores 104, 204, as well as at least one valve component 106, 206 that is disposed in at least one of the plurality of bores 104, 204 that defines an axis of translation 108, 208, a radial direction 110, 210, and a circumferential direction 112, 212.

This valve component 106, 206 may take various forms including a spool 300, **300*a*, a poppet valve member 400, an annular valve seat member 500, a compensator cup 600, 600*a*, etc. as will be discussed in further detail later herein with reference to FIG. 3 thru 10, 12, 13, and 15 thru 22**.

Figure 2:
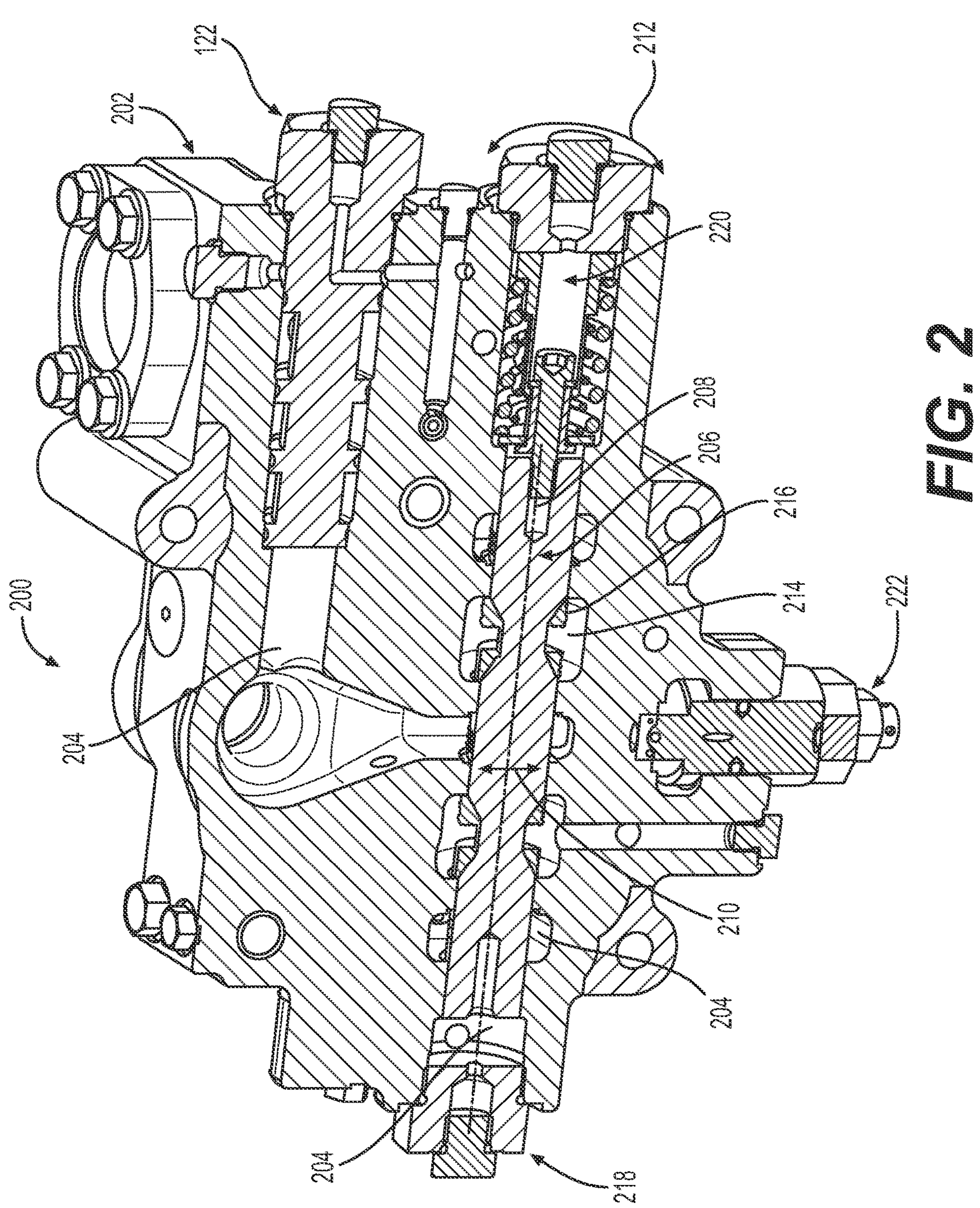
FIG. 2 is a sectional view of a hydraulic valve assembly including a valve spool constructed via additive manufacturing similar to that of FIG. 1 according to another embodiment of the present disclosure.
Figures 5, 6:
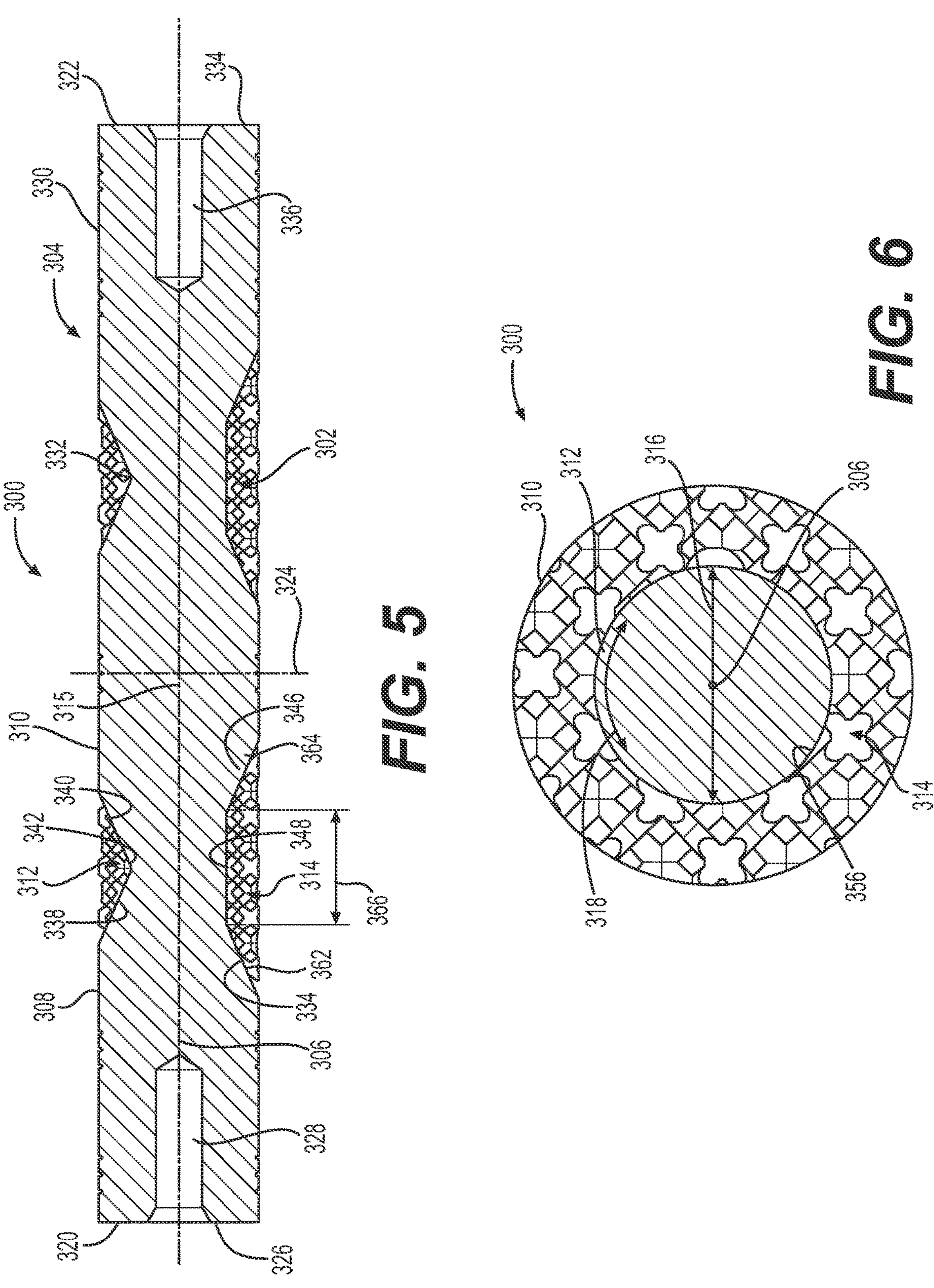
FIG. 5 is a front sectional view of the spool of FIG. 4.
FIG. 6 is a side sectional view of the spool of FIG. 4 taken along lines 6-6 thereof.
Figure 7:
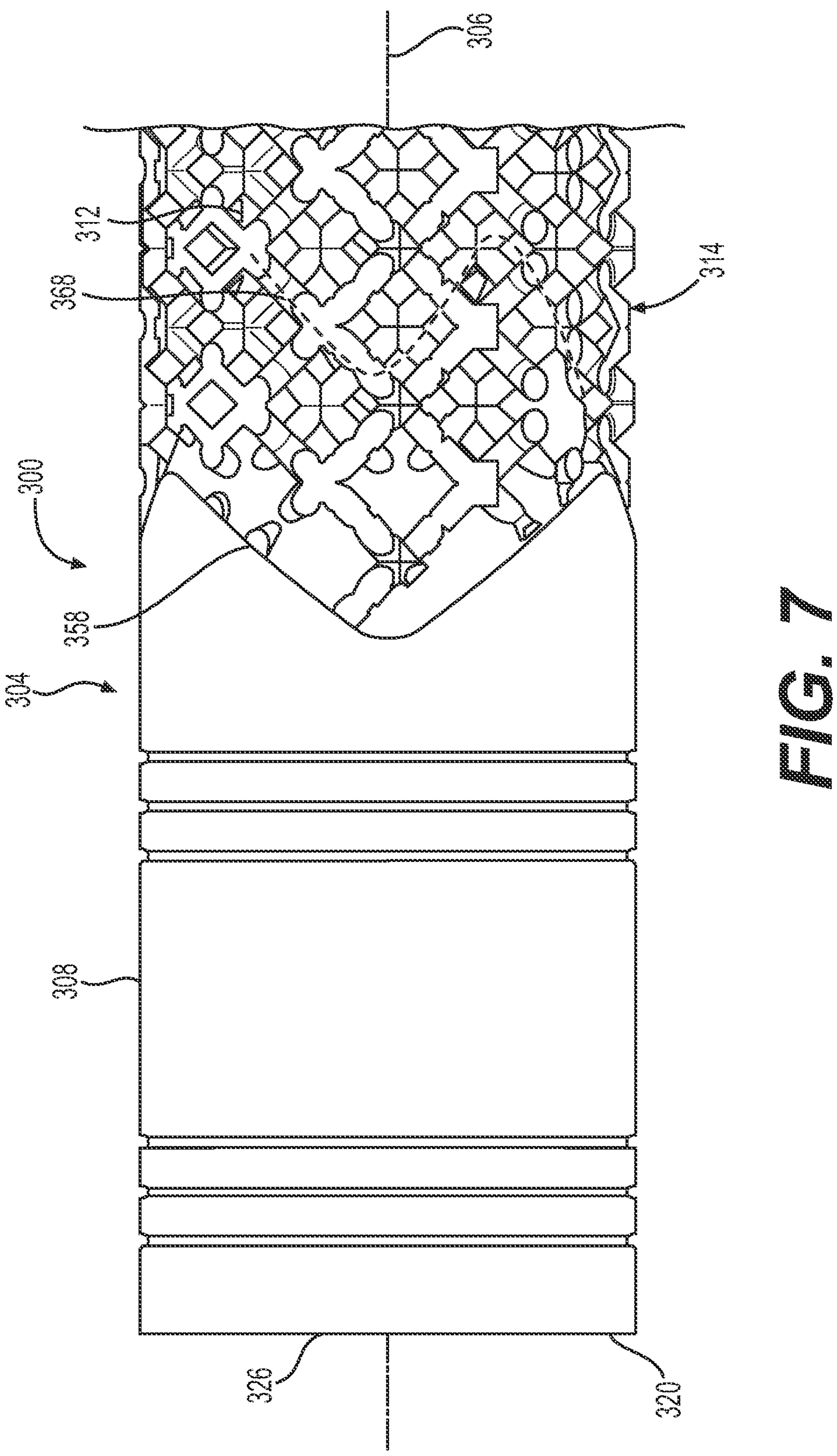
FIG. 7 is an enlarged detail view of the spool of FIG. 4, showing the left end of the spool in more detail.

With continued reference to FIGS. 1 and 2, such a valve component 106, 206 may include a flow aperture 114, 214 that is at least partially defined by a mesh structure 116, 216, or a structure that is drafted along the radial direction (e.g., see the drafted flow apertures **602*a* of the compensator cup 600*a* in FIG. 19 thru 22), or that includes a change in size along the circumferential direction (e.g., see the flow aperture 302 of the spool 300 in FIG. 5, or the flow aperture 602 of the compensator cup 600 in FIG. 15 thru 18**, etc.).

As shown in FIGS. 1 and 2, the valve assemblies of any embodiment discussed herein may comprise miscellaneous components such as plugs 118, 218 that are inserted into the housing member to block the bores used for assembly and manufacturing the housing member during the casting process, spring loaded mechanisms 120, 220 (may also be referred to as a centering spring assembly with retainers) for influencing the translation of spools or movement of other valve components, a pressure relief valve(s) 222, a diverter valve 122, a cushion orifice 224, etc.

Figure 11:
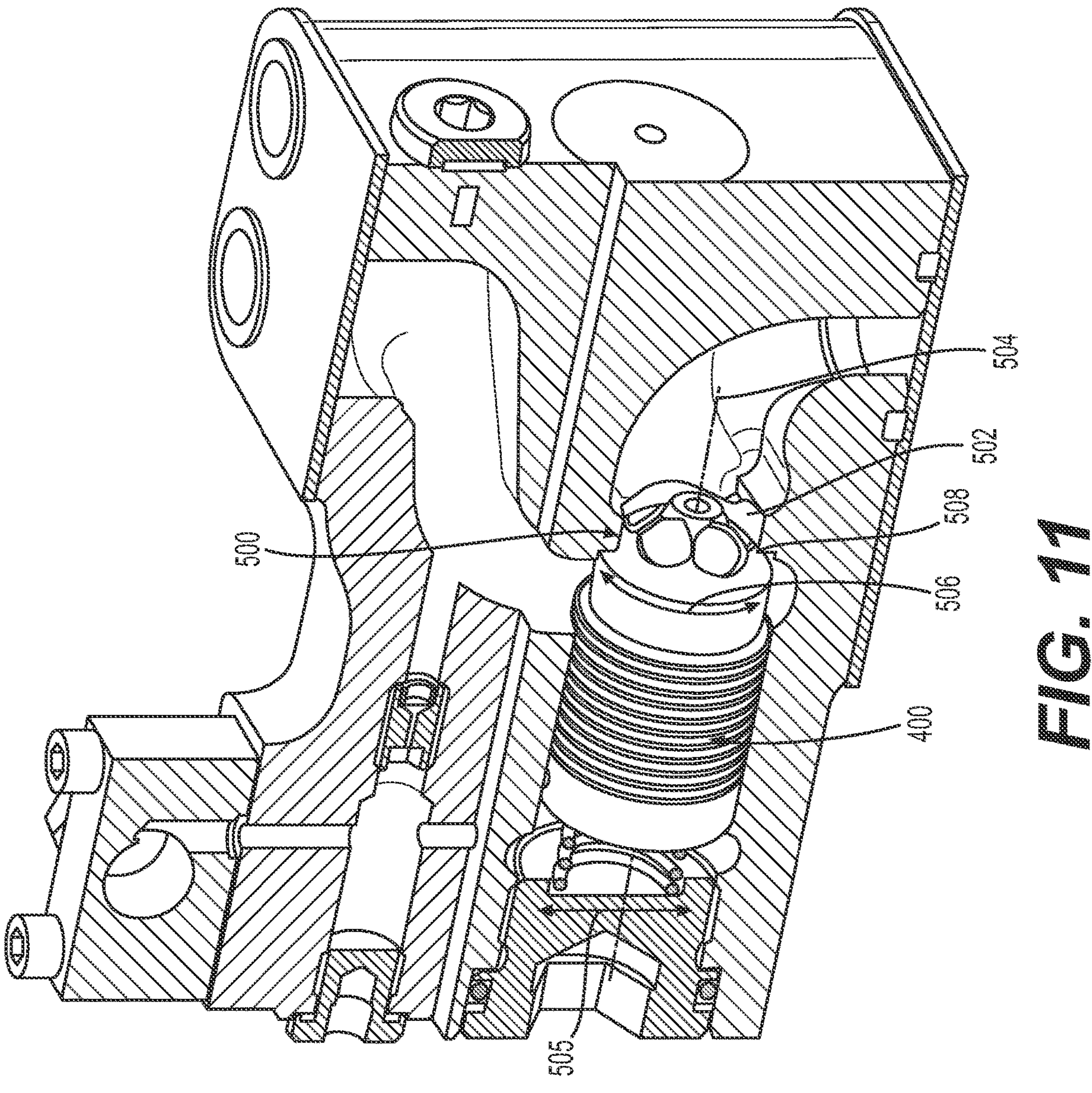
FIG. 11 is a sectional view of a valve assembly using a poppet valve manufactured via additive manufacturing according to an embodiment of the present disclosure.
Figure 14:
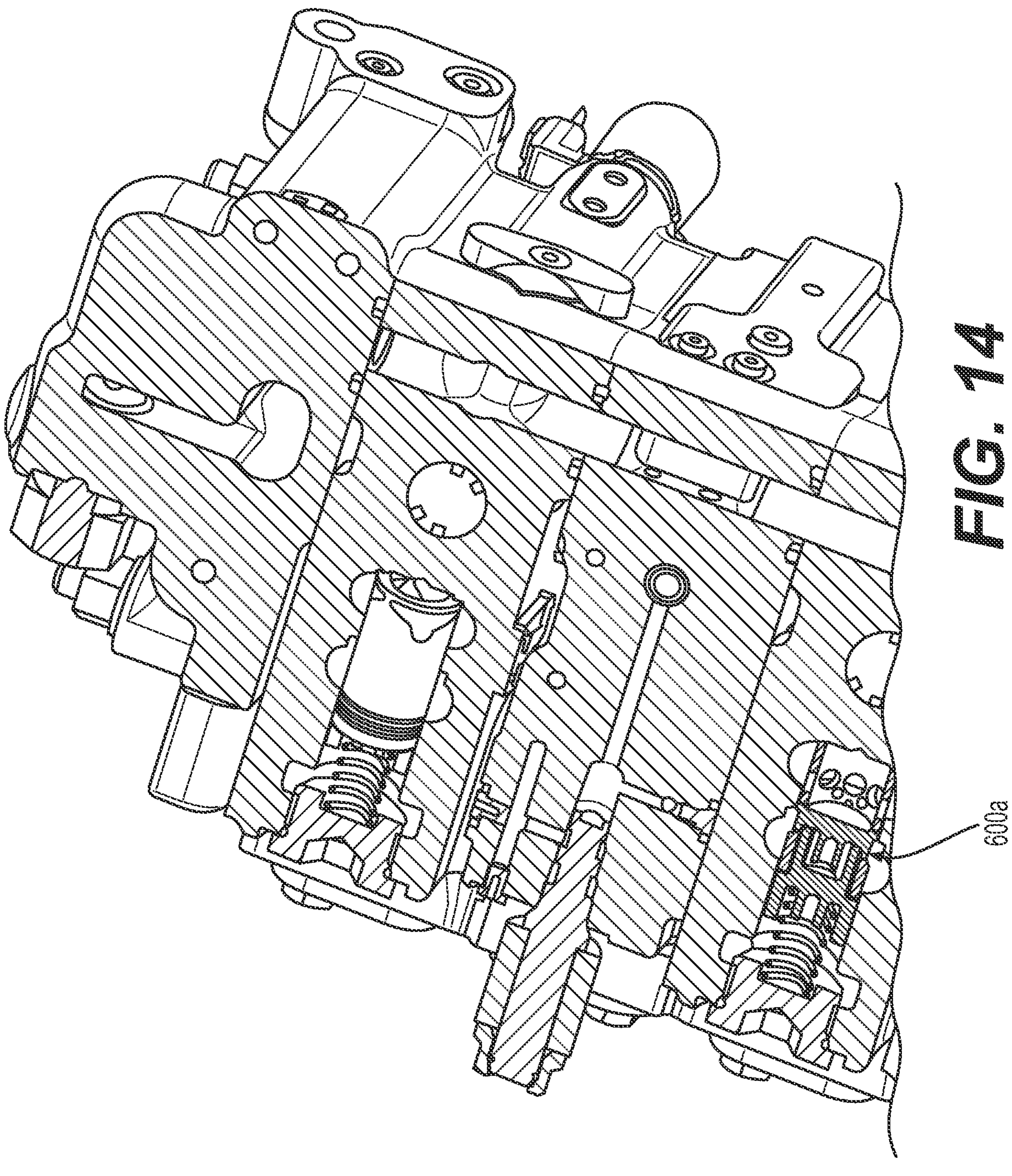
FIG. 14 is a sectional view of a valve assembly using a compensator manufactured via additive manufacturing according to an embodiment of the present disclosure.

It is to be understood that the valve assemblies shown in FIGS. 11 and 14 may be similarly or identically configured as the valve assemblies shown in FIGS. 1 and 2, except that a poppet valve subassembly may be provided that employs a poppet valve member 400, and/or an annular valve seat member 500. Alternatively, or additionally, a compensator cup 600, 600*a* as described herein may be provided. The valve assembly using the compensator cup may provide for a hydraulic circuit that moves the spool so that the output load from the valve assembly remains constant despite what loads are placed onto the hydraulically driven mechanism that receives fluid from the circuit of the valve assembly.

Turning now to FIG. 3 thru 10, various embodiments of a spool 300, 300*a* that may be provided as a replacement part in the field or as a retrofit to existing valve assemblies in the field will now be discussed in further detail.

Such spools 300, 300*a* may define an elongated body 304, 304*a* defining a longitudinal axis 306, 306*a*, a first outer diameter portion 308, 308*a*, and a second outer diameter portion 310, 310*a* that is spaced longitudinally away from the first outer diameter portion 308, 308*a*. These portions may have the same diameter as shown in FIG. 3 thru 10, but not necessarily so. A first necked down portion 312, 312*a* (e.g., see FIG. 5 and FIG. 9) may be disposed longitudinally between the first outer diameter portion 308, 308*a*, and the second outer diameter portion 310, 310*a*. This may not be the case for other embodiments of the present disclosure.

Figures 8, 9:
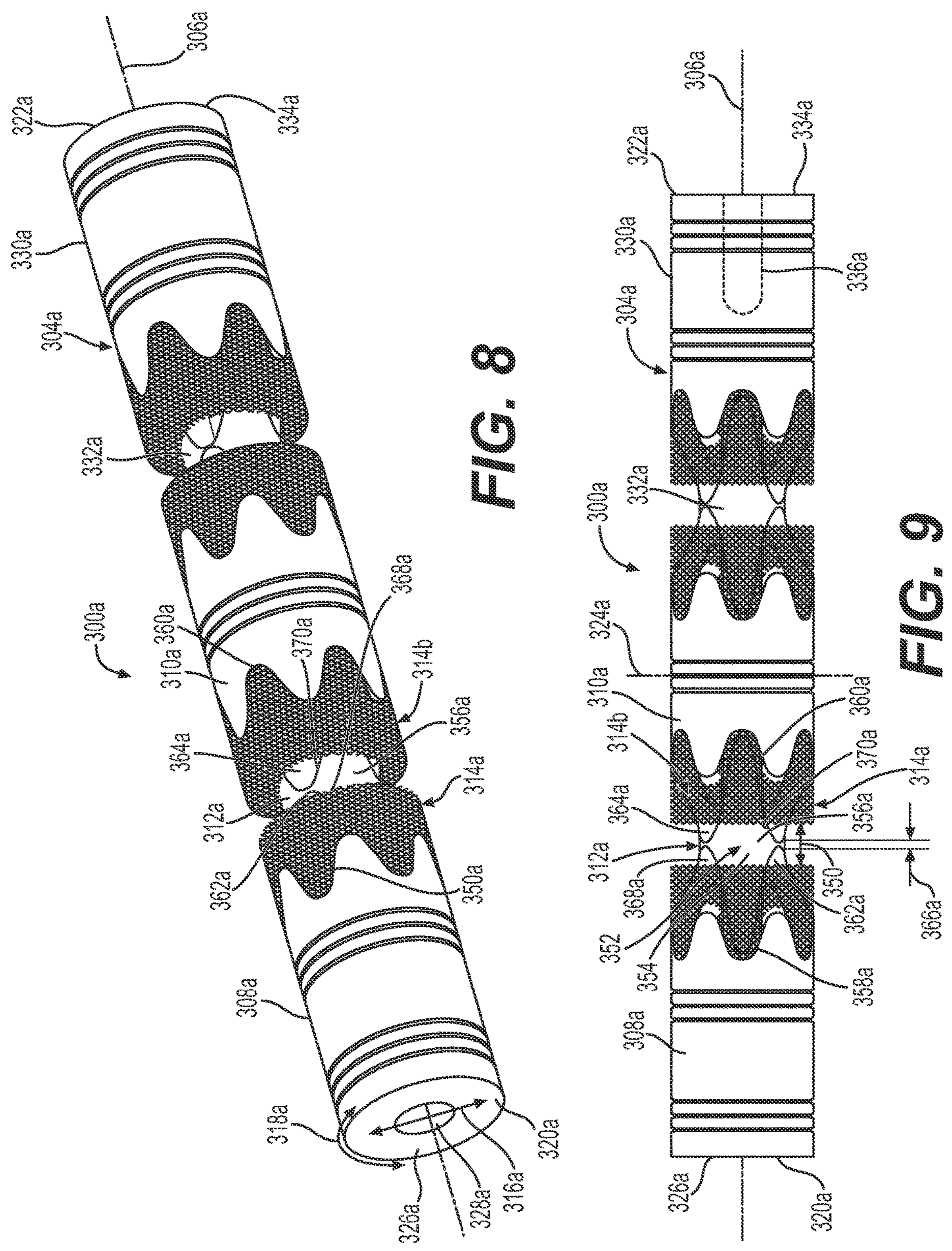
FIG. 8 is perspective view of a spool according to another embodiment of the present disclosure that may be used in the assemblies of FIGS. 1 and 2 with some of the lattice structure removed.
FIG. 9 is a front view of the spool of FIG. 8.
Figure 10:
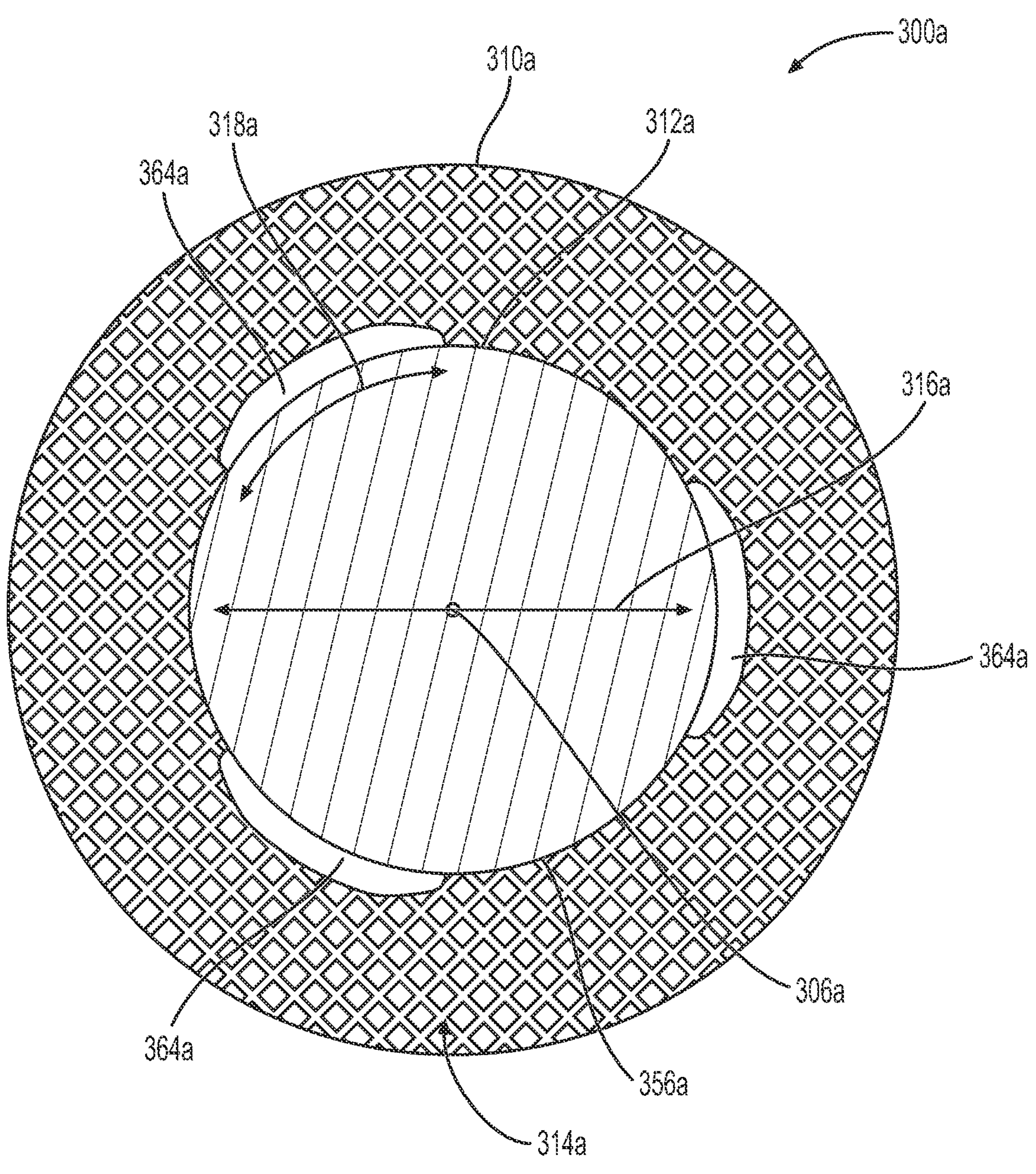
FIG. 10 is a side sectional view of the spool of FIG. 9 taken along lines 10-10 thereof.

Moreover, the elongated body 304, 304*a* may include at least one of the following: a lattice structure 314, 314*a* (may be a coarse mesh as shown in FIG. 3 thru 7, or a fine mesh as shown in FIG. 8 thru 10) that extends from the first outer diameter portion diameter portion 308, 308*a* to the first necked down portion 312, 312*a*, and a cross-section of the first necked down portion 312 that is asymmetrical about a plane 315 that passes through the longitudinal axis 306 (e.g., see FIG. 5). Put another way, the configuration of the first necked down portion may vary along the periphery of the spool, but not necessarily so.

Figures 3, 4:
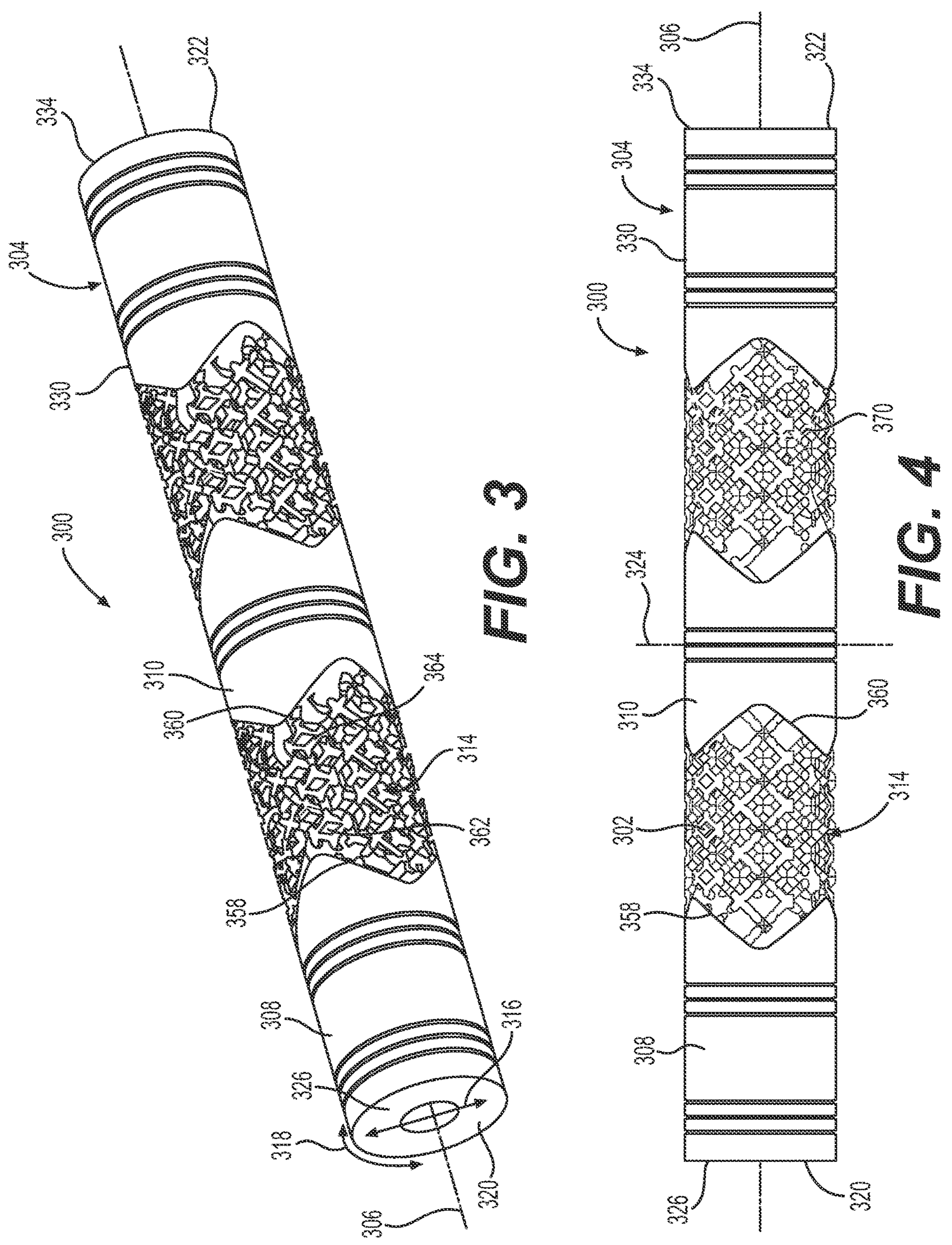
FIG. 3 is a perspective view of a spool manufactured via additive manufacturing according to an embodiment of the present disclosure that may be used in the valve assembly of FIG. 1 or 2.
FIG. 4 is a front view of the spool of FIG. 3.

For the spools 300, 300*a* in FIGS. 3 and 8, the elongated body 304, 304*a* may be at least partially cylindrical defining a radial direction 316, 316*a*, and a circumferential direction 318, 318*a*, and the longitudinal axis 306, 306*a* takes the form of a cylindrical axis. The plane 315 of spool 300 in FIG. 5 contains the radial direction 316, and the cylindrical axis, but not necessarily so. Also, both spools 300, 300*a* in FIGS. 5, 8, and 9, have a lattice structure 314, 314*a* that extends radially to the first necked down portion 312, 312*a*. This may not be the case for other embodiments of the present disclosure.

Looking at FIGS. 3 and 8, the elongated body 304, 304*a* of the spools 300, 300*a* each define a first longitudinal end 320, 320*a* that is disposed along the cylindrical axis, a second longitudinal end 322, 322*a* that is disposed along the cylindrical axis, and a midplane 324, 324*a* (see FIG. 4 and FIG. 9) that is disposed at the midpoint longitudinally between first longitudinal end 320, 320*a*, and the second longitudinal end 324, 324*a*. As best seen in FIGS. 5 and 8, and the first longitudinal end 320, 320*a* may include a first end face 326, 326*a* that defines a first tapped hole 328, 328*a* extending longitudinally from the first end face 326, 326*a* that aid in manufacturing and/or assembly. This may not be the case for other embodiments of the present disclosure.

As best seen in FIGS. 4, 5, and 9, these elongated bodies 304, 304*a* may be symmetrical about the midplane 324, 324*a* that divides the second outer diameter portion 310, 310*a* into half, but not necessarily so. The first outer diameter portion 308, 308*a* may extend longitudinally from the first longitudinal end 320, 320*a*, while a third outer diameter portion 330, 330*a* may extend longitudinally from the second longitudinal end 322, 322*a* toward a second necked down portion 332, 332*a* (see FIGS. 5, 8, and 9). Also, the second longitudinal end 322, 322*a* may include a second end face 334, 334*a* that defines a second tapped hole 336, 336*a* extending longitudinally from the second end face 334, 334*a*. These features may be altered or omitted in other embodiments of the present disclosure.

In FIG. 5, the cross-section of the first necked down portion 312 includes a first top angled edge 338, and a second top angled edge 340 that meets at a vertex or a radius (see intersection point 342). Also, a first bottom angled edge 344, and a second bottom angled edge 346 that are connected by a bottom straight longitudinal edge 348. Also, the lattice structure 314 extends longitudinally from the first outer diameter portion 308 completely to the second outer diameter portion 310.

Other configurations are possible in other embodiments of the present disclosure. For example, as best seen in FIGS. 8 and 9, the lattice structure 314*a* may extend from the first outer diameter portion 308*a* to the first necked down portion 312*a*, and another lattice structure 314*b* may extend from the second outer diameter portion 310*a* to the first necked down portion 312*a*, forming a gap 350 that is bounded by the first necked down portion 312*a*, the lattice structure 312*a* that extends from the first outer diameter portion 308*a*, and the other lattice structure 314*b* that extends from the second outer diameter portion 310*a*. This gap may form part of the flow aperture for the spool 300*a*. Again, other configurations are possible in other embodiments of the present disclosure.

More specifically, the first necked down portion 312*a* may at least partially be formed by a groove 352 that is defined by a concave arcuate surface 354 extending circumferentially about the cylindrical axis. The first necked down portion 312*a* may further include a reduced diameter convex portion 356*a* as seen in FIG. 10.

Looking at FIGS. 3, 4, and 7 thru 9, it can be understood that the first outer diameter portion 308, 308*a* of both spools 300, 300*a* may intersect the first necked down portion 312, 312*a* at a first undulating edge 358, 358*a* that extends circumferentially about the elongated body 304, 304*a*, while the second outer diameter portion 310, 310*a* may intersect the first necked down portion 312, 312*a* at a second undulating edge 360, 360*a* that extends circumferentially about the elongated body 304, 304*a*. These wavy edges may be in sync circumferentially with each other as shown, but not necessarily so.

In FIGS. 3 and 4, the first necked down portion 312 includes a reduced diameter cylindrical portion 356 (best seen in FIG. 5), and a first plurality of lobes 362 extending longitudinally and radially from the reduced diameter cylindrical portion 356 to the first undulating edge 358, as well as a second plurality of lobes 364 extending longitudinally and radially from the reduced diameter cylindrical portion 356 to the second undulating edge 360. The first plurality of lobes 362 may be spaced a longitudinal distance 366 away from the second plurality of lobes 364 (see FIG. 5), and may also be in phase circumferentially with the first plurality of lobes. This may not be the case in other embodiments of the present disclosure.

Furthermore, the first plurality of lobes 362 may form a first wavy intersection 368 (see FIG. 7) with the reduced diameter cylindrical portion 356, and the second plurality of lobes 364 may define a second wavy intersection 370 with the reduced diameter cylindrical portion 356. These wavy intersection may be in phase with each other circumferentially, but not necessarily so.

On the other hand, in FIGS. 8 and 9, it is shown that the first plurality of lobes 362*a* of the spool 300*a* may extend longitudinally and radially from a reduced diameter convex portion 356*a* to the first undulating edge 358*a*, while a second plurality of lobes 364*a* may extend longitudinally and radially from the reduced diameter convex portion 356*a* to the second undulating edge 360*a*. The first plurality of lobes 362 may be spaced a longitudinal distance 366*a* (see FIG. FIG. 9) away from the second plurality of lobes 364*a*, and may be in phase circumferentially with the first plurality of lobes 362*a*, but not necessarily so. The first plurality of lobes 362*a* may form a first undulating intersection 368*a* with the reduced diameter convex portion 356*a*, while the second plurality of lobes 364*a* may also define a second undulating intersection 370*a* with the reduced diameter convex portion 356*a*. The lobes may be out of phase with the wavy or undulating edges or intersections for this embodiment of the disclosure. This may not be true for other embodiments of the present disclosure.

Figure 12:
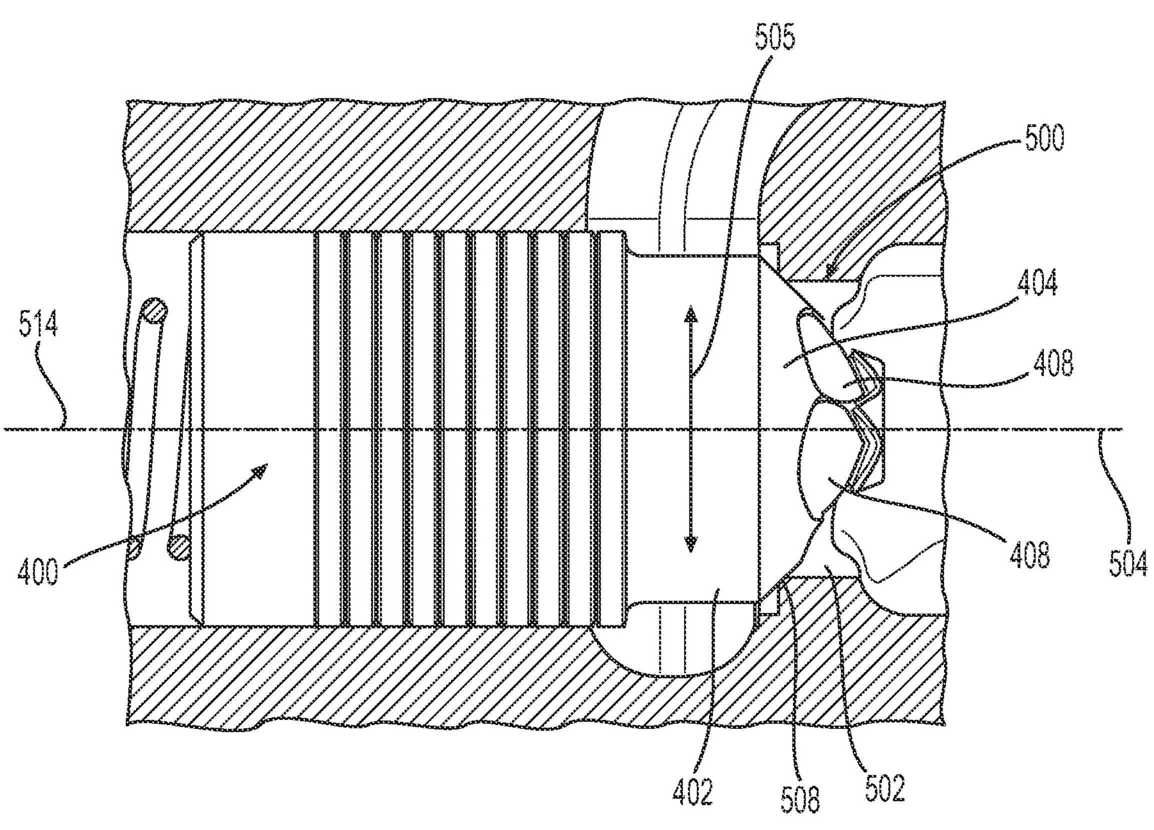
FIG. 12 is an enlarged sectional view of a poppet valve subassembly of FIG. 11 according to an embodiment of the present disclosure, depicting the mating of a poppet valve member with an annular valve seat member.
Figure 13:
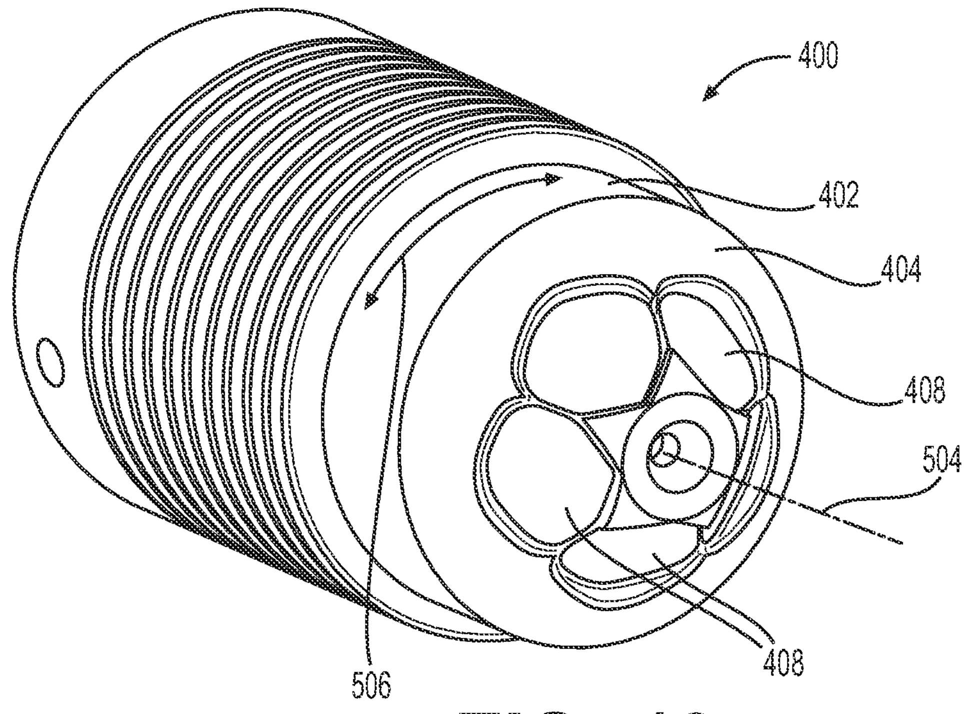
FIG. 13 is a perspective view of the poppet valve member of FIGS. 11 and 12 shown in isolation, and more clearly showing its flow apertures in the form of dimples on its cone face.

Referring now to FIG. 11 thru 13, a poppet valve assembly and a subassembly according to an embodiment of the present disclosure may comprise an annular valve seat member 500 including a first arcuate surface 502, defining an axis of rotation 504 (so called since the surface 502 may be modeled by rotating geometry about this axis in CAD (computer aided design), may also be the same as an axis of rotation for the poppet valve member), a radial direction 505, and a circumferential direction 506. A valve seating surface 508 may extend radially from the first arcuate surface 502. The subassembly may also comprise a poppet valve member 400 that includes a second arcuate surface 402, and a sealing surface 404 that extends radially from the second arcuate surface 402, and axially toward the valve seating surface 508. The surfaces 404, and 508 may be at least partially complimentarily shaped relative to each other, but not necessarily so. As shown, both these surfaces may be conical, etc.

At least one or both of the valve seat member 500, and the poppet valve member 400 may include at least one of the following: a first mesh (not shown but may be similar to that discussed earlier herein) that extends from the first arcuate surface 502 that partially defines a flow orifice, a second mesh (not shown but may be similar to that discussed earlier herein) that extends from the second arcuate surface 402 that partially defines a flow orifice 408 (may take the form of a series of dimples arranged circumferentially on the sealing surface 404, etc.), asymmetric configuration of the first arcuate surface 502 or the valve seating surface 508, about a plane 514 that contains the radial direction and the axis of rotation, and asymmetric configuration of the second arcuate surface 402 or the sealing surface 404 about a plane 514 that contains the radial direction and the axis of rotation. Put another way, these surfaces 502, 402, and their features may vary in configuration along the circumferential direction.

Alternatively, or in addition, at least one flow aperture may extend radially from the first arcuate surface or the second arcuate surface, and the at least one flow aperture may include at least one of following: asymmetry about a plane that is perpendicular to the axis of rotation, and a change in size along the radial direction.

Various embodiments of a compensator cup 600, 600*a* that may be provided as a replacement part or a retrofit for a valve assembly (e.g., see FIG. 14) in the field will now be discussed with reference to FIG. 15 thru 22.

Such compensator cups 600, 600*a* may have a body including an arcuate surface 604, 604*a* defining an axis of rotation 606, 606*a* (so called since the geometry may be modeled by rotating a cross-section about this axis in CAD (computer aided drafting), may also be an axis of translation in use), a radial direction 608, 608*a*, and a circumferential direction 610, 610*a*. A first axial end 612, 612*a* and a second axial end 614, 614*a* may be disposed along the axis 606, 606*a*.

In addition, a first blind bore 616, 616*a* may extend from the first axial end 612, 612*a* toward the second axial end 614, 614*a* defining a diameter 618, 618*a*, and at least one flow aperture 602, 602*a* may extend radially from the arcuate surface 604, 604*a* to the first blind bore 616, 616*a*. The at least one flow aperture 602, 602*a* may include at least one of following: a change in size along the circumferential direction 610 (e.g., see FIG. 15), and a change in size along the radial direction 608*a* (e.g., see FIGS. 21 and 22).

Figures 18, 19, 20:
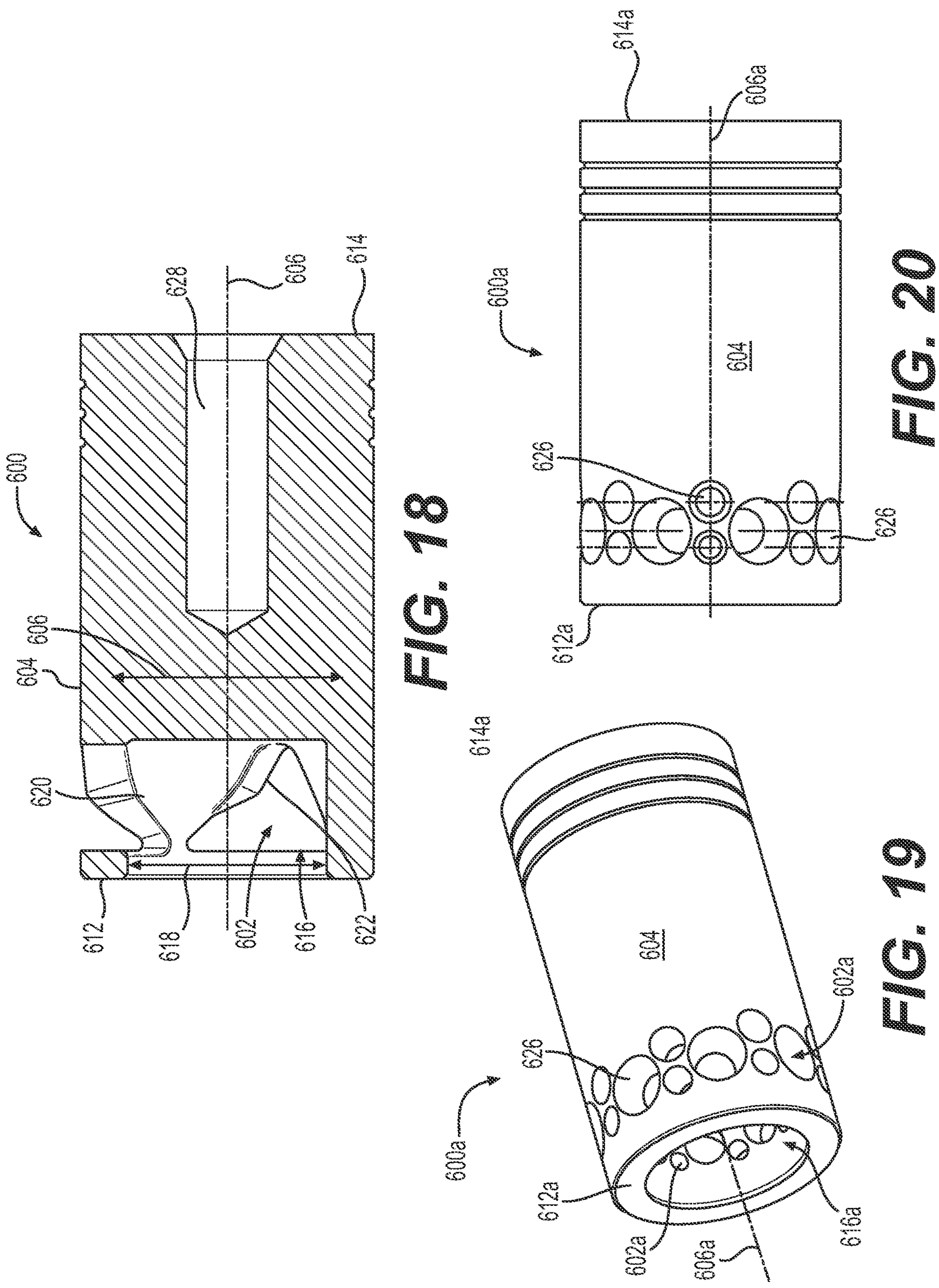
FIG. 18 is front sectional view of the compensator of FIG. 16.
FIG. 19 is a perspective view of a compensator according to another embodiment of the present disclosure that is manufactured via additive manufacturing, and that may be used in the valve assembly of FIG. 14.
FIG. 20 is a front view of the compensator of FIG. 19.
Figure 21:
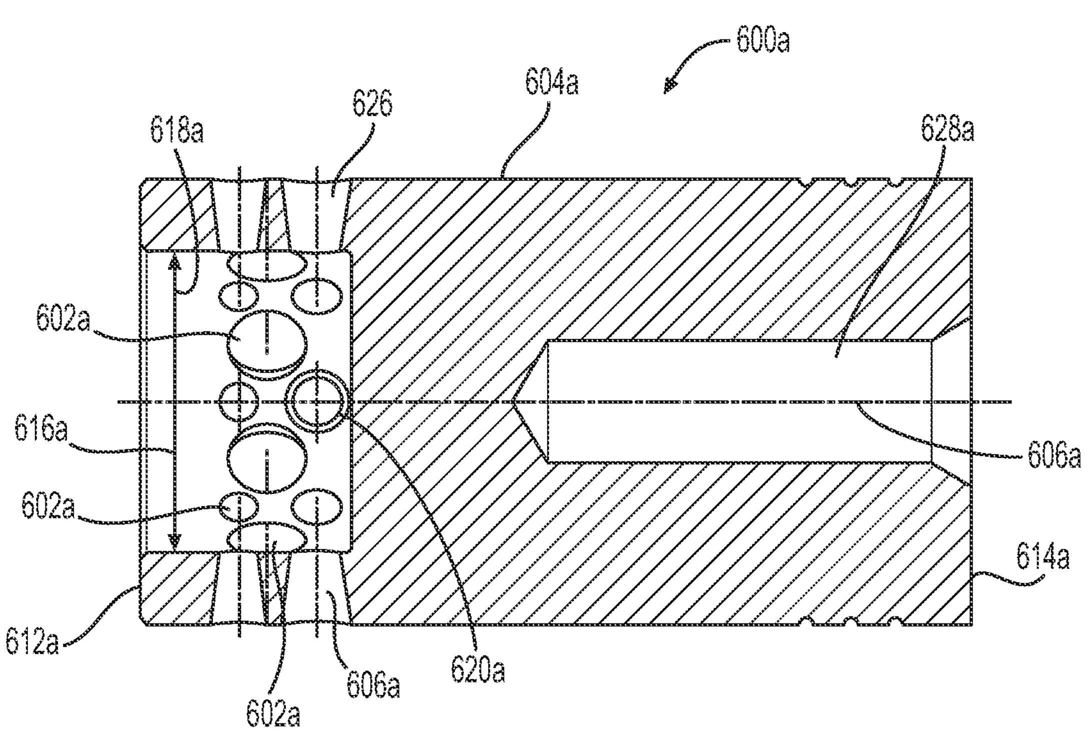
FIG. 21 is front sectional view of the compensator of FIG. 20.

Looking at FIGS. 18 and 21, at least one flow aperture 602, 602*a* may be at least partially defined by a blend 620, 620*a* at an intersection of the at least one flow aperture 602, 602*a* and the first blind bore 616, 616*a*. This may be difficult or impossible to create via conventional machining.

Figures 15, 16, 17:
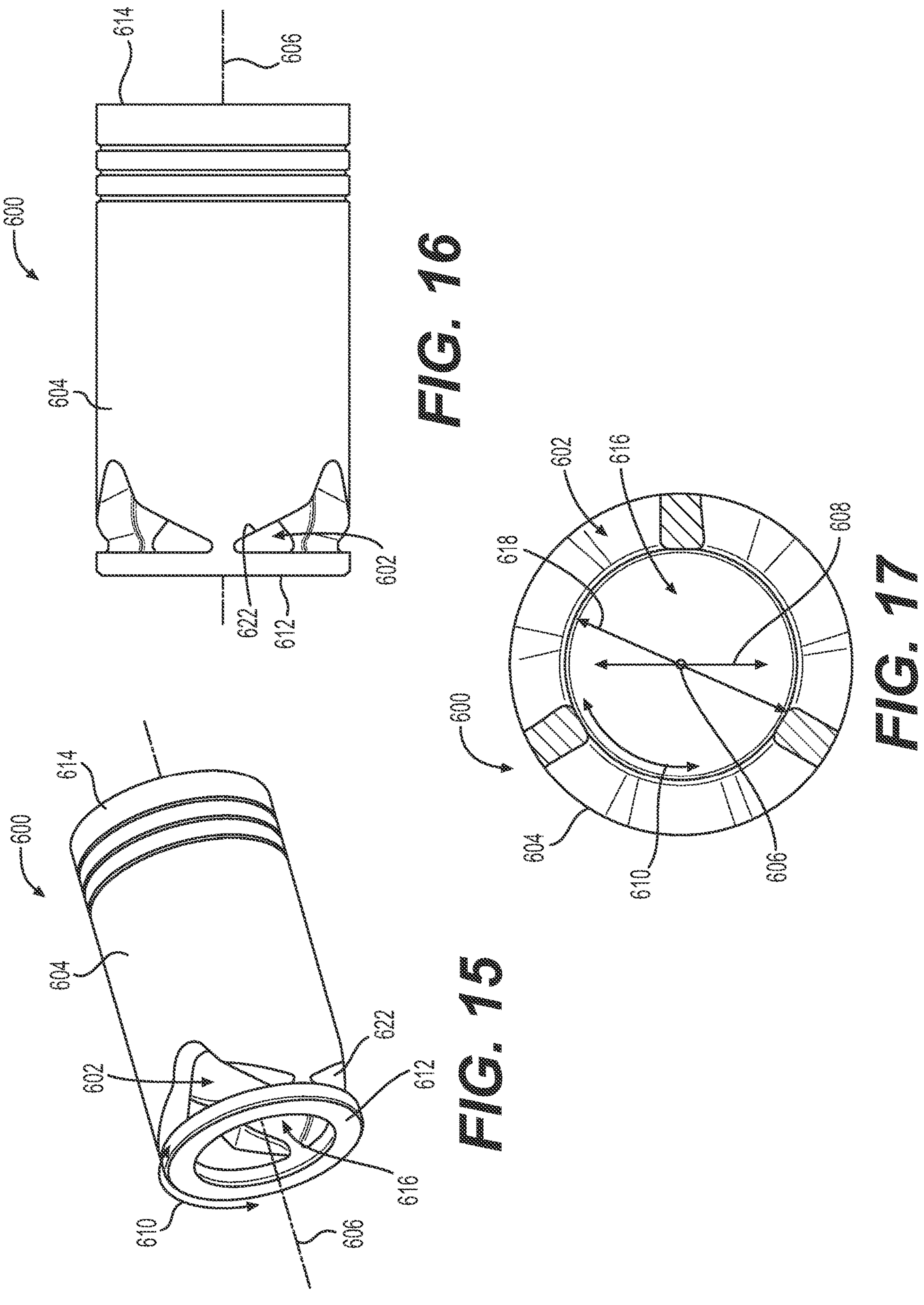
FIG. 15 is a perspective view of a compensator according to an embodiment of the present disclosure that may be manufactured via additive manufacturing, and that may be used in the valve assembly of FIG. 14.
FIG. 16 is a front view of the compensator of FIG. 15.
FIG. 17 is a side sectional view of the compensator of FIG. 16 taken along lines 17-17 thereof.

In FIGS. 15, and 16 the at least one flow aperture 602 may form a tri-lobe perimeter 622 at the arcuate surface 604. Other configurations are possible.

Figure 22:
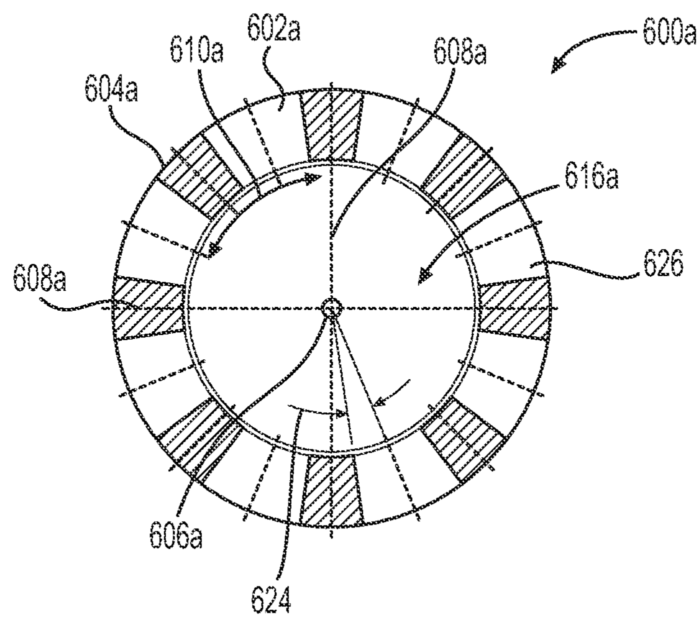
FIG. 22 is a side sectional view of the compensator of FIG. 20 taken along lines 22-22 thereof.

For example, as seen in FIG. 22, the change in size in the radial direction 608*a* includes a positive radial draft 624, increasing the size (e.g., the diameter of the flow aperture) along the outward radial direction. In the other embodiments of the present disclosure, a change in size includes a negative radial draft, decreasing the size along the outward radial direction.

With continued reference to FIGS. 20 and 21, at least one flow aperture 602*a* may take the form of a conical bore 626 having a decreasing diameter along the inward radial direction 608*a*. This may not be the case in other embodiments of the present disclosure.

As shown in FIG. 19 thru 22, a plurality of conical bores 626 may be provided having different diameters projected on a plane that is tangent to the arcuate surface 604.

Looking at FIGS. 18 and 21, a second blind bore 628, 628*a* may extend from the second axial end 614, 614*a* toward the first axial end 612, 612*a* defining a smaller diameter than the diameter 618 of the first blind bore 616, 616*a*. The second blind bores may take the form of tapped holes that may aid in the manufacture of the compensator cup, the assembly process, and/or the disassembly process when used in a valve assembly.

It should be noted that any of these components and their features may be differently configured in other embodiments of the present disclosure. The components of the valve assembly may be manufactured from any suitable material including, but not limited to, steel, aluminum, thermoplastics, etc. as long as the material is durable enough to withstand the pressures, and are chemically compatible with the fluids being used.

Any of the dimensions, configurations, etc. discussed herein may be varied as needed or desired to be different than any value or characteristic specifically mentioned herein or shown in the drawings for any of the embodiments.

INDUSTRIAL APPLICABILITY

In practice, a valve assembly, a valve component such as spool, a poppet valve subassembly component, and/or compensator cup constructed according any embodiment disclosed herein may be sold, bought, manufactured or otherwise obtained in an OEM (original equipment manufacturer) or aftermarket context. In some cases, various components of the valve assembly, and the poppet valve subassembly, etc. may be provided as a kit to repair or retrofit a hydraulic system or other apparatus (e.g., a lubricant system etc.) in the field.

The disclosed valve components including a spool, a poppet valve member, an annular valve seat member, and a compensator cup, etc. may be manufactured using conventional techniques such as, for example, casting or molding. Alternatively, the disclosed valve components may be manufactured using other techniques generally referred to as additive manufacturing or additive fabrication.

Known additive manufacturing/fabrication processes include techniques such as, for example, 3D printing. 3D printing is a process wherein material may be deposited in successive layers under the control of a computer. The computer controls additive fabrication equipment to deposit the successive layers according to a three-dimensional model (e.g., a digital file such as an AMF or STL file) that is configured to be converted into a plurality of slices, for example substantially two-dimensional slices, that each define a cross-sectional layer of the valve component in order to manufacture, or fabricate, the valve component. In one case, the disclosed valve component would be an original component and the 3D printing process would be utilized to manufacture the valve component. In other cases, the 3D process could be used to replicate an existing valve component and the replicated valve components could be sold as aftermarket parts. These replicated aftermarket valve components could be either exact copies of the original valve component, pseudo copies differing in only non-critical aspects, new embodiments that provide a smoother decrease or increase of fluid flow past the valve component, etc.

In particular embodiments of the present disclosure, a powder bed fusion process or a direct laser sintering process may be used to manufacture the valve components using a metallic material such as steel, etc. Other process may be used in other embodiments of the present disclosure.

Figure 23:
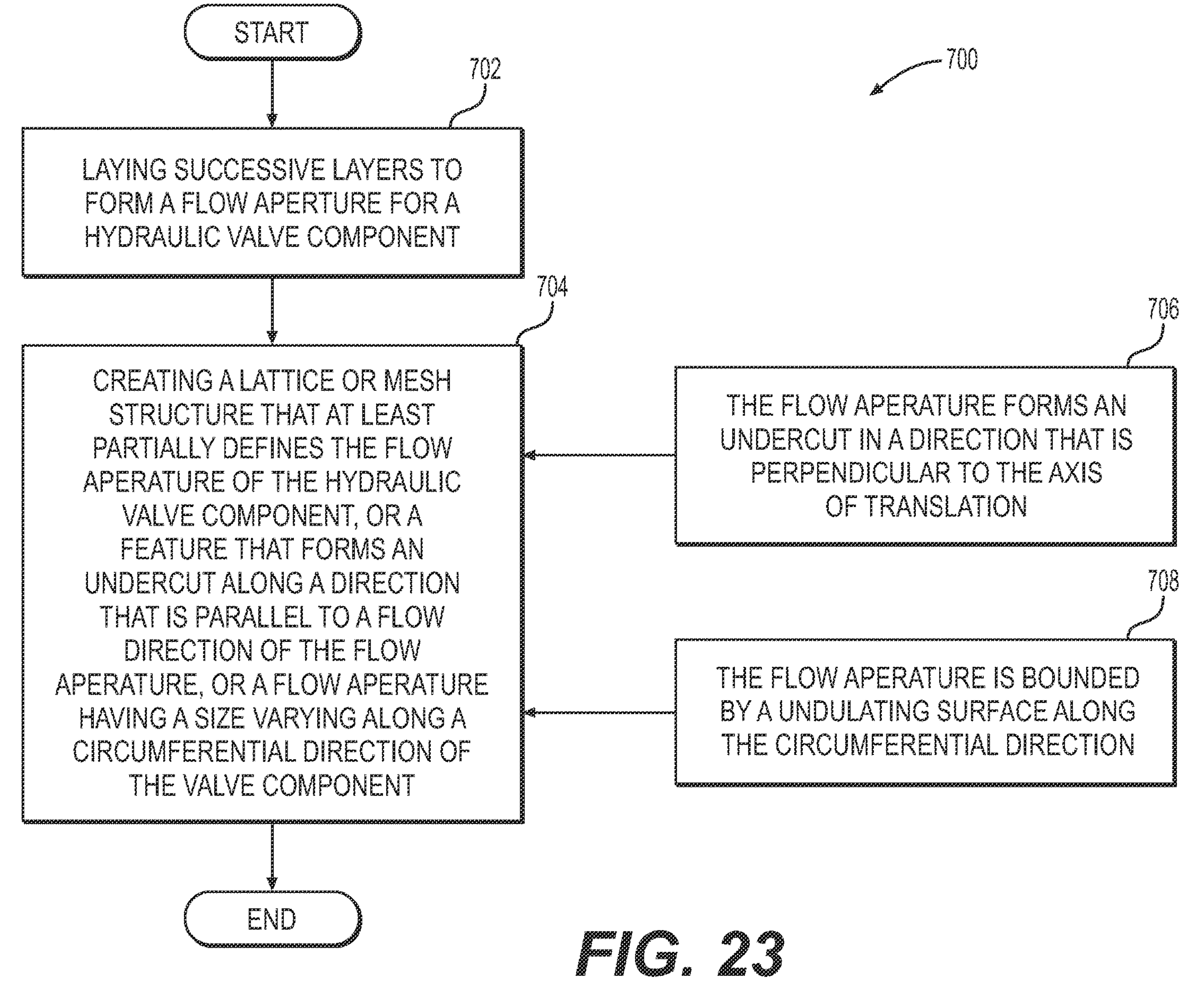
FIG. 23 depicts a flowchart illustrating a method of manufacturing a component of a valve assembly via additive manufacturing according to an embodiment of the present disclosure.

FIG. 23 depicts a method of manufacturing a hydraulic valve component (using a type of fluid) via additive manufacturing according to an embodiment of the present disclosure. The method 700 may comprise laying successive layers to form a flow aperture for a hydraulic valve component (see 702), and creating a lattice or mesh structure that at least partially defines the flow aperture of the hydraulic valve component, or a feature that forms an undercut along a direction that is parallel to a flow direction of the flow aperture, or a flow aperture having a size varying along a circumferential direction of the valve component (see 704).

In some embodiments, the flow aperture forms an undercut in a direction that is perpendicular to the axis of translation (see 706).

In further embodiments, the flow aperture is bounded by an undulating surface along the circumferential direction (see 708).

Figure 24:
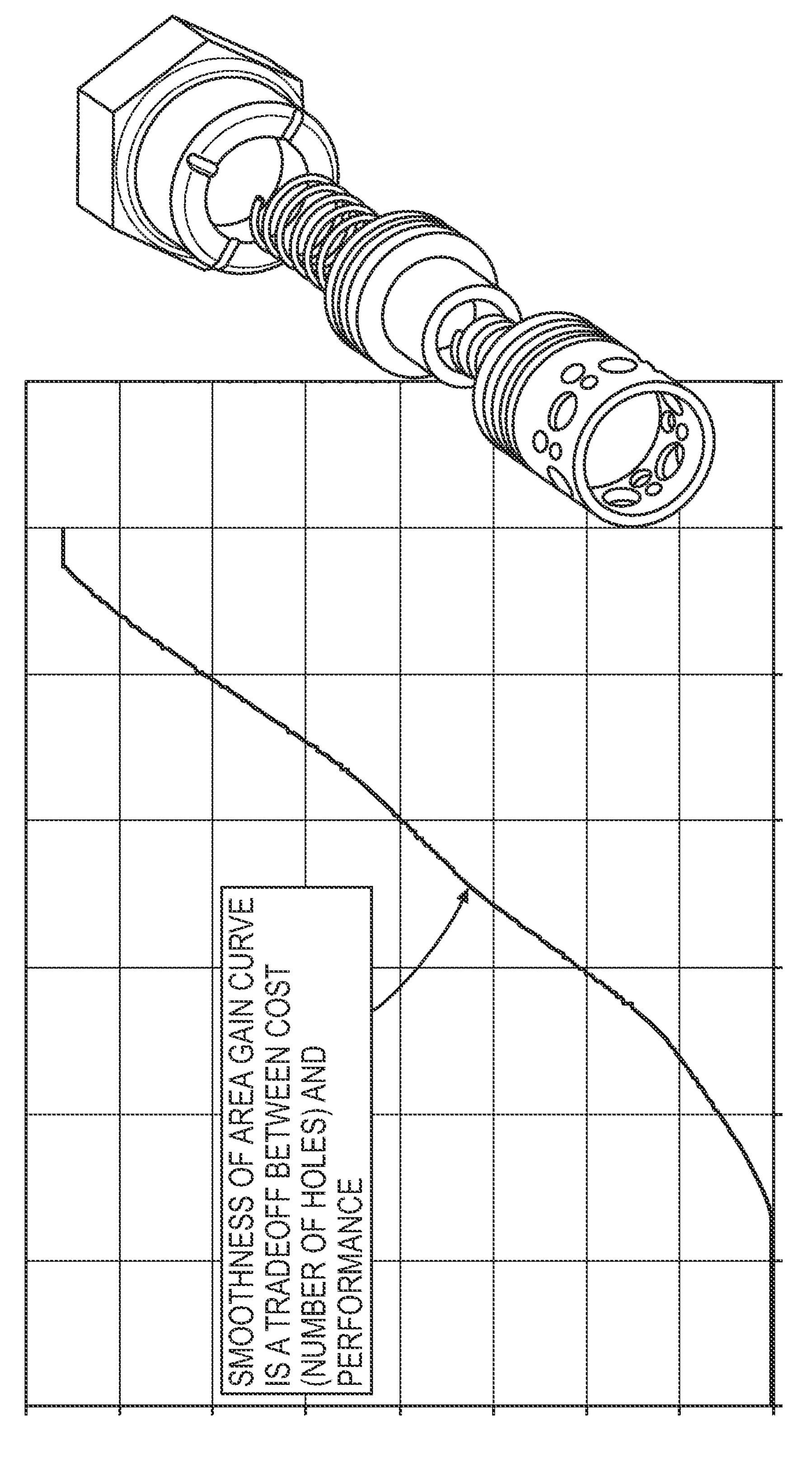
FIG. 24 is a graph that shows the smoothness of the area gain curve that is achievable for a compensator cup or other valve member with a flow orifice that is constructed via additive manufacturing according to various embodiments of the present disclosure.

FIG. 24 illustrates the critical result that using valve components with more intricate geometry that is tailored according to embodiments of the present disclosure may provide. For example, the even metering of fluid flow as a valve component closes or opens, not taught by the prior art may be accomplished. As a result, the transmission of shock loads may be prevented from being conveyed to hydraulic run mechanisms and the like, reducing maintenance and enhancing fine control of such mechanisms.

As used herein, the articles “a” and “an” are intended to include one or more items, and may be used interchangeably with “one or more.” Where only one item is intended, the term “one” or similar language is used. Also, as used herein, the terms “has”, “have”, “having”, “with” or the like are intended to be open-ended terms. Further, the phrase “based on” is intended to mean “based, at least in part, on” unless explicitly stated otherwise.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A valve assembly comprising:

a housing member defining a plurality of bores;

at least one valve component that is disposed in at least one of the plurality of bores and that defines a central axis, the at least one valve component extending along a radial direction that is orthogonal to the central axis and having a solid portion;

wherein the at least one valve component includes:

a valve seat member having a flow orifice that is at least partially defined by a lattice structure.

2. The valve assembly of claim 1, further including a poppet valve member, wherein the valve seat member is configured to surround a portion of the poppet valve member.

3. The valve assembly of claim 1, wherein the valve seat member has an annular shape.

4. A valve assembly comprising:

A housing member defining a plurality of bores; and a valve component that is disposed in at least one of the plurality of bores and that is movable along an axis of translation, the valve component extending along a radial direction that is orthogonal to the axis of translation, wherein the valve component includes a poppet valve member having a longitudinal axis about which the poppet valve member is configured to rotate, the poppet valve member having one or more structures formed by additive manufacturing, the one or more structures including a flow orifice that is asymmetrical about a plane that is perpendicular to the longitudinal axis.

5. The valve assembly of claim 4, wherein the one or more structures formed by additive manufacturing also include a lattice.

6. The valve assembly of claim 4, wherein the poppet valve member includes a mesh.

7. The valve assembly of claim 6, wherein the mesh is connected an arcuate surface of the poppet valve member that partially defines the flow orifice.

8. The valve assembly of claim 4, wherein the flow orifice is formed as a plurality of dimples.

9. The valve assembly of claim 8, wherein the plurality of dimples are arranged on a sealing surface of the poppet valve member.

10. A valve assembly comprising:

a housing member defining a plurality of bores; and a valve component that is disposed in at least one of the plurality of bores and that is movable along an axis of translation, the valve component extending along a radial direction that is orthogonal to the axis of translation:

Wherein the valve component has one or more structures formed by additive manufacturing, and wherein valve component includes a compensator cup, and the one or more structures formed by additive manufacturing includes a flow aperture that changes in size along a circumferential direction that surrounds the axis of translation.

11. The valve assembly of claim 10, wherein at least a portion of an axial center of the valve component is solid.

12. The valve assembly of claim 10, further including a spool, the compensator cup being part of a hydraulic circuit for moving the spool.

13. The valve assembly of claim 10, wherein the compensator cup includes a blend structure at an intersection of the flow aperture and a blind bore of the compensator cup.

* * * * *